US009605598B2

United States Patent
Hoke et al.

(10) Patent No.: US 9,605,598 B2
(45) Date of Patent: Mar. 28, 2017

(54) FUEL SYSTEM FOR TONE CONTROL AND OPERABILITY

(71) Applicant: United Technologies Corporation, Hartford, CT (US)

(72) Inventors: James B. Hoke, Tolland, CT (US); Anthony Van, Palm City, FL (US)

(73) Assignee: United Technologies Corporation, Farmington, CT (US)

( * ) Notice: Subject to any disclaimer, the term of this patent is extended or adjusted under 35 U.S.C. 154(b) by 99 days.

(21) Appl. No.: 14/884,487

(22) Filed: Oct. 15, 2015

(65) Prior Publication Data

US 2016/0195024 A1 Jul. 7, 2016

Related U.S. Application Data

(60) Provisional application No. 62/065,339, filed on Oct. 17, 2014.

(51) Int. Cl.
*F02C 9/26* (2006.01)
*F02C 7/228* (2006.01)
*F02C 7/232* (2006.01)
*F02C 9/34* (2006.01)

(52) U.S. Cl.
CPC .............. *F02C 9/263* (2013.01); *F02C 7/228* (2013.01); *F02C 7/232* (2013.01); *F02C 9/34* (2013.01); *F05D 2260/96* (2013.01); *F05D 2270/14* (2013.01)

(58) Field of Classification Search
CPC .................................. F02C 7/228; F02C 7/26
See application file for complete search history.

(56) References Cited

U.S. PATENT DOCUMENTS

| | | | | |
|---|---|---|---|---|
| 2,672,726 A | * | 3/1954 | Wolf | F02C 3/36 60/225 |
| 2,726,507 A | * | 12/1955 | Baker | F02K 1/17 60/223 |
| 2,806,350 A | * | 9/1957 | Hoffmann | F02K 7/10 244/53 B |
| 2,816,745 A | | 12/1957 | McCain | |
| 2,963,082 A | * | 12/1960 | Binford | F02C 7/228 137/107 |
| 4,539,956 A | | 9/1985 | Hengel | |

(Continued)

FOREIGN PATENT DOCUMENTS

WO    2014052221    4/2014

OTHER PUBLICATIONS

EP search report for EP15190457.0 dated Mar. 17, 2016.

(Continued)

*Primary Examiner* — Thomas Tarcza
*Assistant Examiner* — Alex C Dunn
(74) *Attorney, Agent, or Firm* — O'Shea Getz P.C.

(57) ABSTRACT

Aspects of the disclosure are directed to controlling a distribution of fuel to a plurality of nozzles associated with at least one aircraft engine by: determining a state of operation associated with the at least one aircraft engine, causing a valve coupled to a fuel supply and each of the nozzles to open when it is determined that the state of operation indicates a high power state relative to at least one threshold, and causing the valve to close when it is determined that the state of operation indicates a low power state relative to the at least one threshold.

17 Claims, 7 Drawing Sheets

(56) References Cited

U.S. PATENT DOCUMENTS

| | | | |
|---|---|---|---|
| 4,918,925 A | 4/1990 | Tingle | |
| 5,036,657 A | 8/1991 | Seto et al. | |
| 5,321,949 A | 6/1994 | Napoli | |
| 5,775,105 A | 7/1998 | Zinsmeyer | |
| 5,848,525 A | 12/1998 | Spencer | |
| 6,170,540 B1 | 1/2001 | Romero | |
| 8,255,140 B2 | 8/2012 | Sutschek | |
| 9,310,072 B2* | 4/2016 | Ainslie | F23R 3/28 |
| 9,371,779 B2* | 6/2016 | Belghagi | F02C 9/28 |
| 2003/0217545 A1* | 11/2003 | Parsons | F23K 5/06 60/39.281 |
| 2010/0058770 A1* | 3/2010 | Ryan | F23D 11/38 60/776 |
| 2010/0293959 A1* | 11/2010 | Remy | F02C 3/22 60/773 |
| 2013/0125556 A1* | 5/2013 | Hoke | F02C 7/228 60/773 |
| 2013/0199200 A1* | 8/2013 | Hoke | F02C 7/228 60/776 |
| 2013/0219911 A1* | 8/2013 | Dudebout | F02C 7/22 60/778 |
| 2015/0354824 A1* | 12/2015 | Kramer | F23R 3/12 60/737 |
| 2015/0369489 A1 | 12/2015 | Badet et al. | |

OTHER PUBLICATIONS

FAA.gov, "Chapter 14 Aircraft Fuel System", downloaded on Oct. 16, 2014 from <https://www.faa.gov/regulations_policies/handbooks_manuals/aircraft/amt_airframe_handbook/media/ama_ch14.pdf>.

Wikipedia, "Engine Control Unit", downloaded on Oct. 16, 2014 from <http://en.wikipedia.org/wiki/Engine_control_unit>.

TheCarGuys.net, "Fuel Intake System", downloaded on Oct. 16, 2014 from <http://www.thecarguys.net/carburators.pdf>.

FAA.gov, "AirAirplane Turbofan Engine Operation and Malfunctions Basic Familiarization for Flight Crews", downloaded on Oct. 16, 2014 from <https://www.google.com/url?sa=t&rct=j&q=&esrc=s&source=web&cd=28&cad=rja&uact=8&ved=0CEkQFjAHOBQ&url=https%3A%2F%2Fwww.faa.gov%2Faircraft%2Fair_cert%2Fdesign_approvals%2Fengine_prop%2Fmedia%2Fengine_malf_famil.doc&ei=GNM_VOnqLJWiyATK1oCADA&usg=AFQjCNGGIKQjlBlbC6Lv5KI-qz-KUSRQXg>.

\* cited by examiner

FUEL SYSTEM FOR TONE CONTROL AND OPERABILITY

This application claims priority to U.S. Patent Appln. No. 62/065,339 filed Oct. 17, 2014.

BACKGROUND

Aircraft engines typically include turbomachinery that is configured for low noise and one or more combustors configured for low nitrogen oxides NOx (e.g., NO and $NO_2$) emissions and operability. The relative contribution of acoustic tones from the combustor to overall noise increases as the contribution of other noise sources is reduced. Reduction in tone amplitude has been demonstrated by creation of local circumferential zones where fuel-air ratio varies. The zones have varying delay times that are observed prior to a release of heat, and consequently, a different coupling to naturally occurring acoustic frequencies.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method for controlling a distribution of fuel to a plurality of nozzles associated with at least one aircraft engine, the method comprising: determining a state of operation associated with the at least one aircraft engine, causing a valve coupled to a fuel supply and each of the nozzles to open when it is determined that the state of operation indicates a high power state relative to at least one threshold, and causing the valve to close when it is determined that the state of operation indicates a low power state relative to the at least one threshold. In some embodiments, the method further comprises establishing a first primary flow number for a first group of the nozzles, and establishing a second primary flow number that is different from the first primary flow number for a second group of the nozzles. In some embodiments, the second primary flow number is less than the first primary flow number, wherein the first group of nozzles is located at a higher altitude than the second group of nozzles. In some embodiments, the fuel supply is coupled to a first group of the nozzles via a primary line, and the valve is coupled to a second group of the nozzles via a secondary line. In some embodiments, the method further comprises establishing a differential pressure of approximately 20 pounds per square inch between the primary line and the secondary line when the valve is open, and establishing a differential pressure of approximately 120 pounds per square inch between the primary line and the secondary line when the valve is closed.

Aspects of the disclosure are directed to a system for controlling a distribution of fuel on an aircraft, the system comprising: a plurality of nozzles associated with at least one aircraft engine, and a valve coupled to a fuel supply and each of the nozzles, wherein the valve is configured to be opened when a state of operation associated with the at least one aircraft engine indicates a high power state relative to at least one threshold, and wherein the valve is configured to be closed when the state of operation associated with the at least one aircraft engine indicates a low power state relative to the at least one threshold. In some embodiments, the system further comprises: a primary line configured to couple the fuel supply to a subset of the nozzles, and a secondary line configured to couple the valve and each of the nozzles. In some embodiments, the valve is configured to establish a differential pressure of approximately 20 pounds per square inch between the primary line and the secondary line when the valve is open, and the valve is configured to establish a differential pressure of approximately 120 pounds per square inch between the primary line and the secondary line when the valve is closed. In some embodiments, the subset of nozzles corresponds to between one-sixth and one-third of the plurality of nozzles, inclusive. In some embodiments, the nozzles are arranged in a ring. In some embodiments, a first group of the nozzles has an associated first primary flow number, and a second group of the nozzles has an associated second primary flow number that is different from the first primary flow number. In some embodiments, the second primary flow number is less than the first primary flow number, and the first group of nozzles is located at a higher altitude than the second group of nozzles. In some embodiments, the first primary flow number and the second primary flow number are each expressed as an amount of fuel flow divided by the square root of a pressure drop, and the first primary flow number is equal to approximately 2.0, and the second primary flow number is equal to approximately 1.5. In some embodiments, the first primary flow number is based on a first size of holes machined into the first group of nozzles, and the second primary flow number is based on a second size of holes machined into the second group of nozzles, and the second size is different from the first size.

Aspects of the disclosure are directed to a system for controlling a distribution of fuel on an aircraft, the system comprising: a first manifold inlet coupled to a subset of a plurality of nozzles, a second manifold inlet coupled to each of the nozzles, a primary line coupled to the first manifold inlet and a fuel supply, a valve coupled to the fuel supply, and a secondary line coupled to the valve and the second manifold inlet. In some embodiments, the valve is configured to be opened when a state of operation associated with at least one engine of the aircraft indicates a high power state relative to at least one threshold, and the valve is configured to be closed when the state of operation associated with the at least one engine indicates a low power state relative to the at least one threshold, and the at least one threshold is based on a maximum thrust associated with the at least one engine. In some embodiments, the system further comprises at least one processor, and memory having instructions stored thereon that, when executed by the at least one processor, cause the system to: determine a state of operation associated with at least one engine of the aircraft, cause the valve to open when it is determined that the state of operation indicates a high power state relative to at least one threshold, and cause the valve to close when it is determined that the state of operation indicates a low power state relative to the at least one threshold. In some embodiments, the valve is configured to establish a differential pressure of approximately 20 pounds per square inch between the primary line and the secondary line when the valve is open, and the valve is configured to establish a differential pressure of approximately 120 pounds per square inch between the primary line and the secondary line when the valve is closed. In some embodiments, a first group of the subset of the nozzles has an associated first primary flow number, and a second group of the subset of the nozzles has an associated second primary flow number that is different from the first primary flow number. In some embodiments, the second primary flow number is less than the first primary flow number, and the first group of nozzles is located at a higher altitude than the second group of nozzles. In some embodiments, the first primary flow number and the second primary flow number are each expressed as an amount of fuel flow divided by the square root of a pressure drop, and the first primary flow number is equal to approximately 2.0, and the second primary flow number is equal to approximately 1.5.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
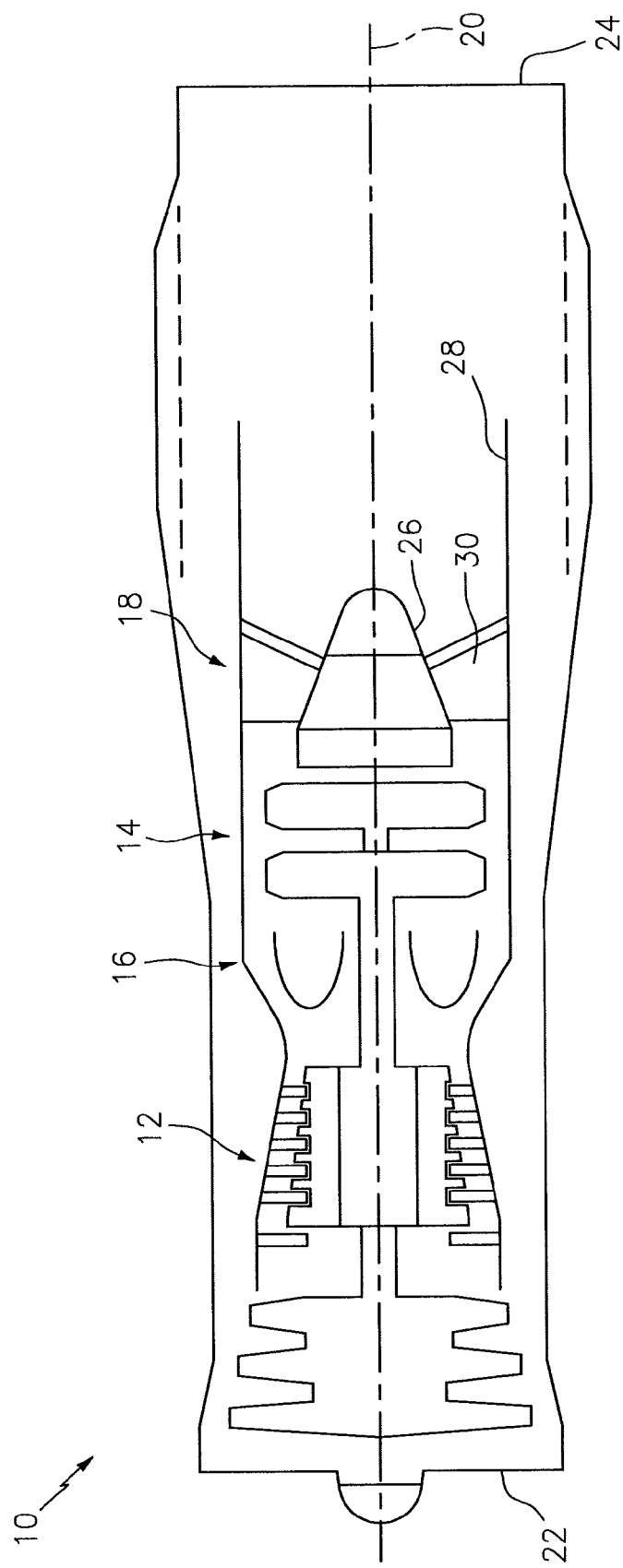
FIG. 1 illustrates an exemplary gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for creating local fuel-air ratio zones by use of differing fuel injector types and control valves. The local fuel air control is also used to enhance stability on snap or instantaneous transient decelerations. In a low power state/condition (corresponding to low fuel flow values) where combustor tones predominate, fuel may be distributed in a non-uniform/asymmetric manner with respect to a number of nozzles in order to minimize/reduce the impact or generation of such tones. The asymmetric distribution of fuel in the low power state/ condition may help to increase the so-called lead blowout margin, which is a measure of the margin that is available in response to a transient condition (e.g., an invocation of a control, such as a pilot command imposed on a throttle, that causes an engine to decelerate) before the engine would need to be reignited. Conversely, in a high power state/ condition (corresponding to high fuel flow values), fuel may be distributed in a uniform/symmetric manner with respect to the nozzles in order to control temperature streaks going into the turbine and enhance engine durability.

A comparison may be made between one or more parameters and one or more thresholds for purposes of determining whether the aircraft or engine is operating in the low power state/condition or the high power state/condition. A low power state/condition may correspond to operation at less than 50% of maximum thrust and a high power state/ condition may correspond to operation at, or greater than, 50% of maximum thrust.

Aspects of the disclosure may be applied in connection with an aircraft, or portion thereof. For example, aspects of the disclosure may be applied in connection with a gas turbine engine. FIG. 1 is a side-sectional illustration of an exemplary gas turbine engine 10. The engine 10 includes a compressor section 12, a turbine section 14 and one or more engine hot sections. The engine hot sections may include, for example, a first engine hot section 16 configured as a combustor section and a second engine hot section 18 configured as an augmentor section. The compressor section 12, the first engine hot section 16, the turbine section 14 and the second engine hot section 18 may be sequentially aligned along an axial centerline 20 between a forward engine airflow inlet 22 and an aft engine airflow exhaust 24.

Figure 2:
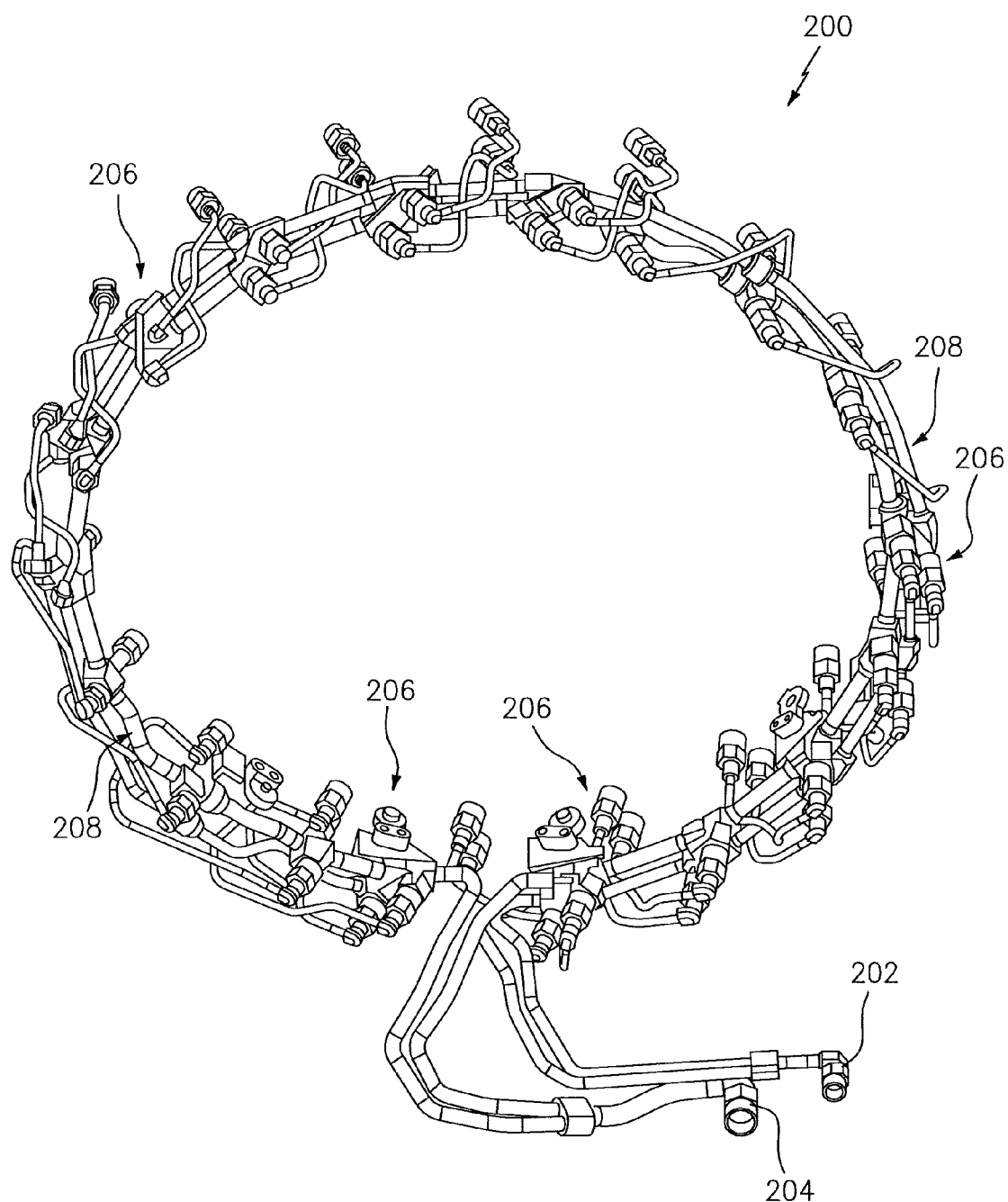
FIG. 2 illustrates an exemplary manifold system.

Referring to FIG. 2, a manifold architecture/system 200 is shown. The system 200 includes two inlets, denoted as a first inlet 202 and a second inlet 204. The first inlet 202 may be used for purposes of supplying a primary (pressure atomizing spray) fuel to a number of nozzles 206 via a first set of pipes 208. The second inlet 204 may be used for purposes of providing a secondary fuel source via a second set of the pipes 208, where the second set of the pipes 208 may be different from the first set of the pipes 208 associated with the first inlet 202. In some embodiments, the primary fuel might only be provided to a subset of the nozzles 206, where the subset is less than the entirety of the nozzles 206, and the secondary fuel may be provided to all of the nozzles 206. Such features are described further below.

Figure 3:
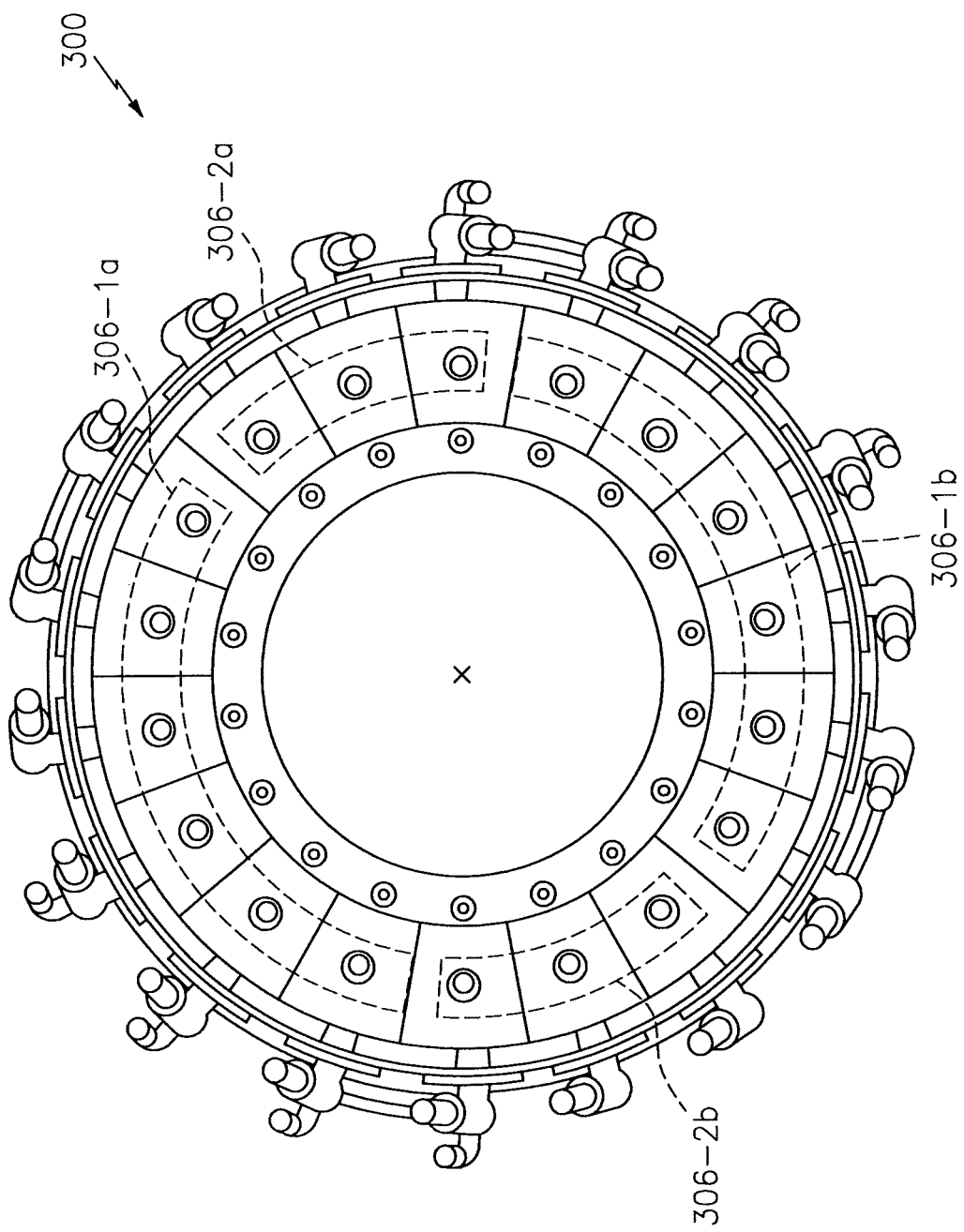
FIG. 3 illustrates an exemplary system incorporating nozzles arranged as groups.

Referring to FIG. 3, a manifold architecture/system 300 is shown. The system 300 may correspond to the system 200.

The system 300 is composed of a number of nozzles arranged as one or more groups. For example, groups 306-1a and 306-1b may each include six nozzles and groups 306-2a and 306-2b may each include three nozzles, providing for a total of eighteen nozzles in the system 300. In some embodiments, the total number of nozzles, or the number of nozzles included in a given group, may be different.

The groups 306-1a and 306-1b may include duplex nozzles, whereas the groups 306-2a and 306-2b may include simplex nozzles. As used herein, a duplex nozzle is configured to receive both primary fuel (e.g., from the primary source/inlet 202 of FIG. 2) and secondary fuel (e.g., from the secondary source/inlet 204 of FIG. 2). A simplex nozzle is configured to receive secondary fuel, but not primary fuel. In some embodiments, between one-sixth (⅙) and one-third (⅓) (inclusive) of the nozzles included in a system (e.g., system 200, 300) may be simplex nozzles.

The alternating pattern of duplex nozzle group 306-1a, simplex nozzle group 306-2a, duplex nozzle group 306-1b, and simplex nozzle group 306-2b in FIG. 3 may be used to reduce the tones of a circumferential or tangential pressure wave inside a combustor (e.g., combustor/first engine hot section 16 of FIG. 1) by disrupting the pressure wave inside the combustor.

Figure 4:
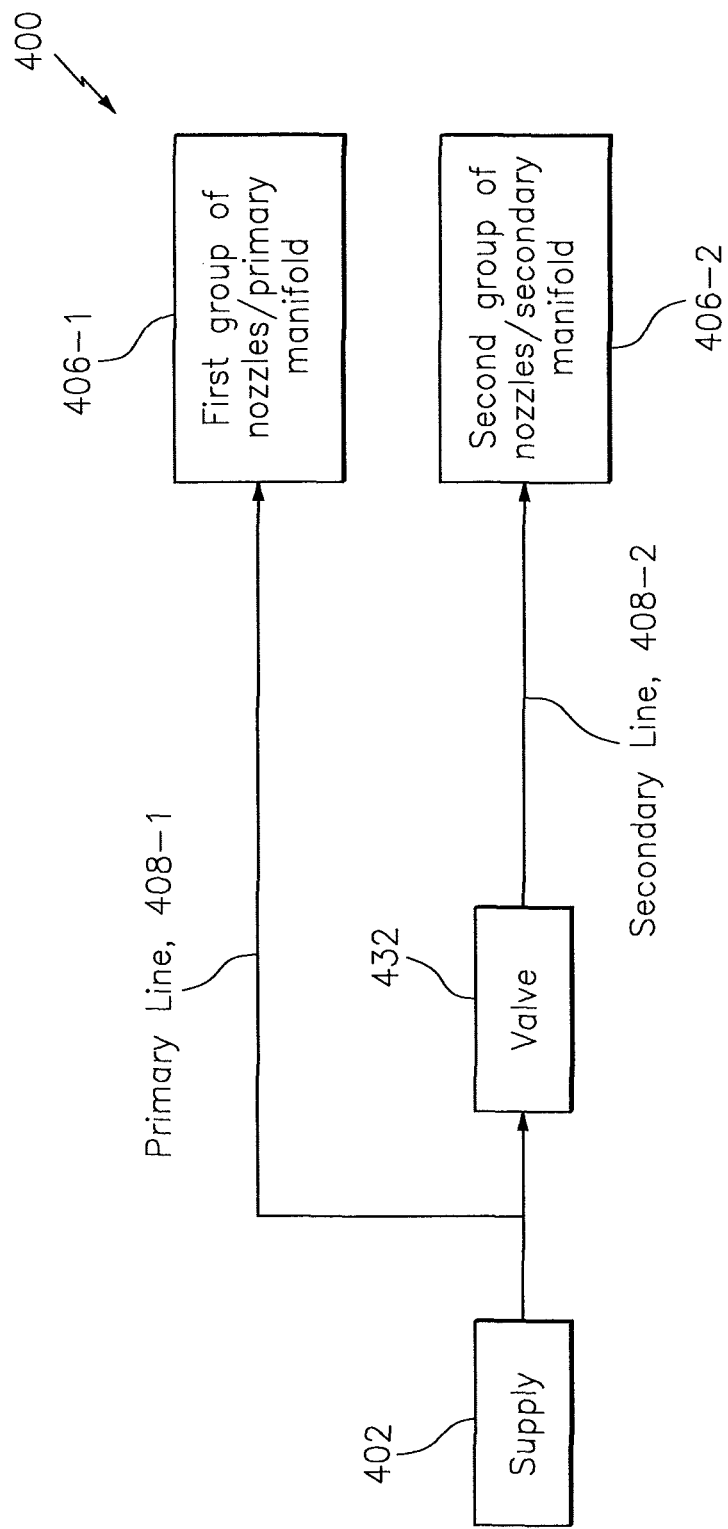
FIG. 4 illustrates a schematic of an example fuel distribution system.

Referring to FIG. 4, a schematic diagram of a system 400 is shown. In the system 400, fuel from a fuel supply 402 is shown as being provided to a first group of nozzles/primary manifold 406-1 via a primary line/channel 408-1. The first group of nozzles 406-1 may include, or be associated with, the nozzles that are included in the groups 306-1a and 306-1b of FIG. 3. The fuel from the supply 402 is also provided to a second group of nozzles/secondary manifold 406-2 via a secondary line/channel 408-2. The second group of nozzles 406-2 may include, or be associated with, all of the nozzles of FIG. 3 (e.g., all of the nozzles included in the groups 306-1a, 306-1b, 306-2a, and 306-2b). One or both of the lines 408-1 and 408-2 may correspond to the pipes 208 of FIG. 2.

The system 400 may include a valve 432. The valve 432 may be implemented using a solenoid. The valve 432 may be used to establish a differential pressure between the primary line 408-1 and the secondary line 408-2. For example, if the valve 432 transitions from an open state to a closed state, an increase in a fuel pressure drop may be experienced by the group 406-1 relative to the group 406-2. This increase in the fuel pressure drop may be accompanied by an increase in fuel flow to the group 406-1 relative to the group 406-2, such that the distribution of the fuel from the supply 402 to the groups 406-1 and 406-2 may be non-uniform/asymmetric. The valve 432 may be closed to accommodate the low power state/condition described above.

Conversely, when the valve 432 transitions from a closed state to an open state, a decrease in the fuel pressure drop may be experienced by the group 406-1 relative to the group 406-2. This decrease in the fuel pressure drop may be accompanied by a decrease in fuel flow to the group 406-1 relative to the group 406-2, such that the distribution of the fuel from the supply 402 to the groups 406-1 and 406-2 may be uniform/symmetric. The valve 432 may be opened to accommodate the high power state/condition described above.

In some embodiments, when the valve 432 is closed a differential pressure of approximately 120 pounds per square inch (psi) may be established between the primary line 408-1 and the secondary line 408-2. When the valve 432 is open a differential pressure of approximately 20 psi may be established between the primary line 408-1 and the second line 408-2.

As shown in FIG. 4, a single valve 432 may be used to selectively control the distribution of fuel flow in the system 400. This represents a departure from techniques where each nozzle was allocated its own valve. Accordingly, the use of a single valve 432 represents a reduction in cost in terms of the nozzles and increases the reliability of the system 400.

Some of the manifolds described herein reflect an arrangement of nozzles (e.g., nozzles 206) or groups of nozzles (e.g., groups 306-1a, 306-1b, 306-2a, and 306-2b) in a ring shape/configuration. Such ring manifolds may experience a fuel mal-distribution (e.g., a non-uniform circumferential distribution of fuel within the ring) due to head-effects, particularly in the presence of low fuel flows (e.g., a low fuel supply 402). The head-effects may be at least partially a result of gravity. If unaccounted for, the head-effects may cause a greater fuel flow to be experienced by lower or bottom nozzles (e.g., nozzles in the group 306-1b) relative to nozzles located at a higher altitude/elevation (e.g., nozzles in the group 306-1a) in the orientation as shown. To account for this disparity/discrepancy a first primary flow number may be established for nozzles located at a higher altitude (e.g., nozzles in the group 306-1a) in the ring and a second primary flow number that is different from (e.g., less than) the first primary flow number may be established for nozzles located in the lower/bottom portion (e.g., nozzles in the group 306-1b) of the ring.

A primary flow number may represent a measure of flow capacity. The primary flow number may be expressed as an amount of fuel flow divided by the square root of a pressure drop. In some embodiments, the first primary flow number described above may have a value of approximately 2.0 and the second primary flow number described above may have a value of approximately 1.5. The values for the first primary flow number and the second primary flow may be established based on a size of holes that are machined in the respective nozzles. For example, the size of the holes may be different so as to cause different primary flow numbers to be established.

Figure 5:
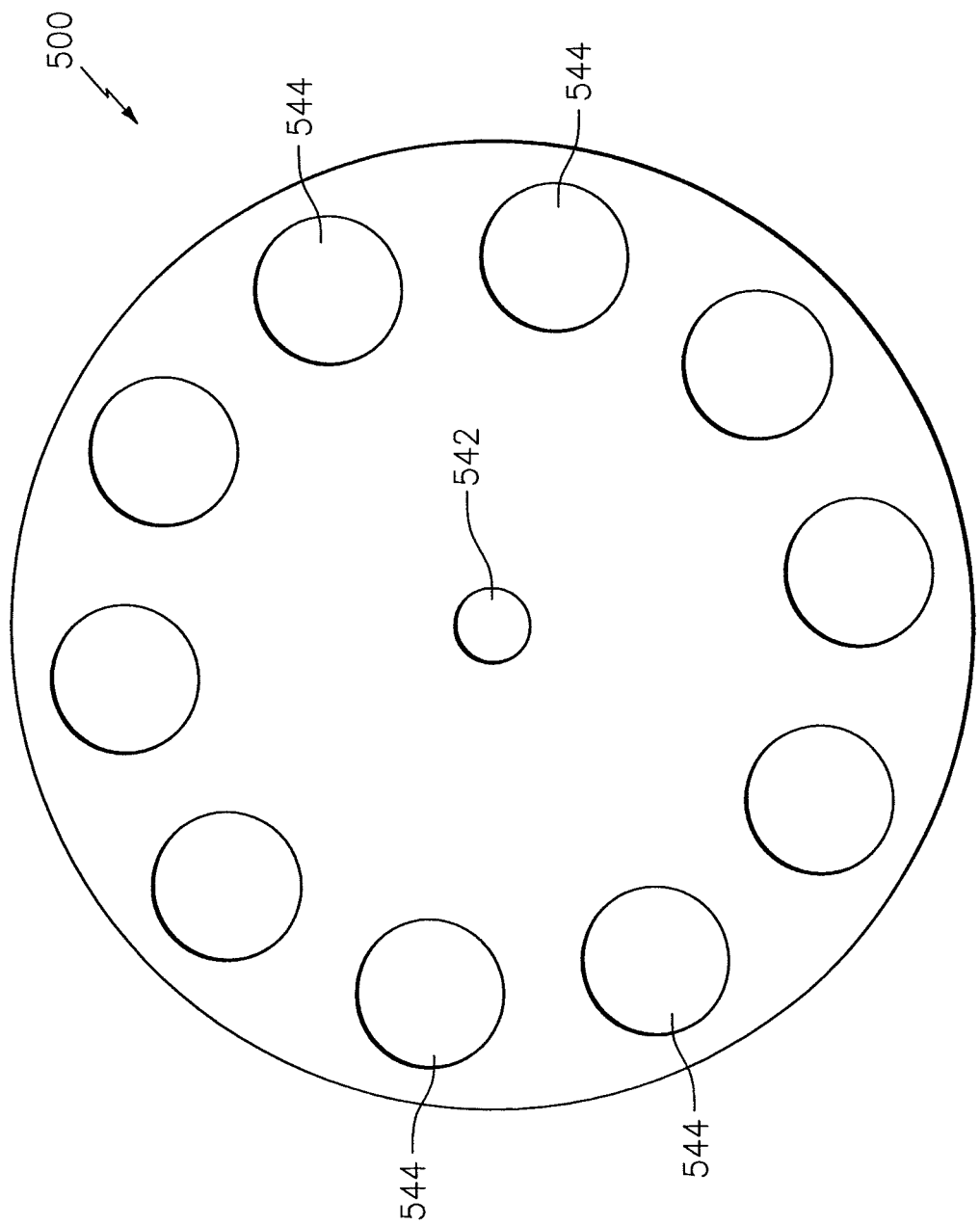
FIG. 5 illustrates a tip of an exemplary nozzle.

Referring to FIG. 5, a diagram of a tip of a nozzle 500 is shown. The tip of the nozzle 500 may be cylindrical in shape. The nozzle 500 may include a primary hole/passage 542 that may be operative based on an applied pressure to generate fuel spray/droplets. The nozzle 500 may include secondary holes/passages 544 that may be operative based on an airflow in generating fuel spray/droplets.

The primary passage 542 may be supplied fuel via the inlet 202 of FIG. 2 and/or the primary line 408-1 of FIG. 4. Similarly, the secondary passages 544 may be supplied fuel via the inlet 204 of FIG. 2 and/or the secondary line 408-2 of FIG. 4. A simplex nozzle might not include the passage 542.

The primary passage 542 may be used for igniting an engine (e.g., engine 10 of FIG. 1). For example, the primary passage 542 may be used to reignite the engine at altitude, where airflow may be insufficient to facilitate generation of the fuel spray/droplets via the secondary passages 544.

FIG. 5 is not necessarily drawn to scale. In some embodiments, the count and/or location of the passage 542 and/or the passages 544 may be different from what is shown. In some embodiments, a size/dimension of the passage 542 may be different from (e.g., smaller than) than a corresponding size/dimension of the passages 544.

Figure 6:
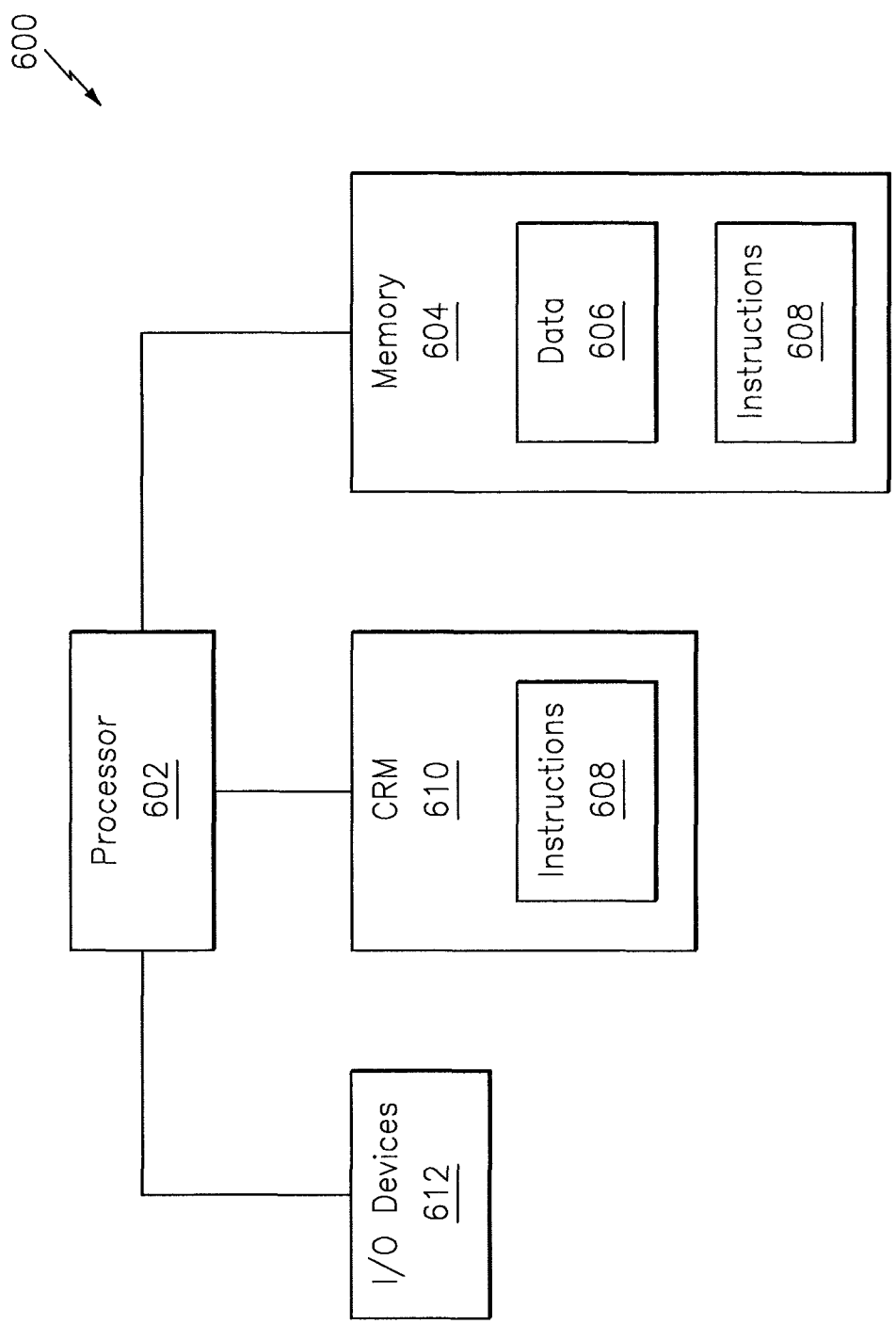
FIG. 6 illustrates an exemplary computing system.

Referring now to FIG. 6, an illustrative system 600 is shown. The system 600 includes one or more processors (generally shown by a processor 602) and a memory 604. The memory 604 may store data 606 and/or instructions 608. The system 600 may include a computer-readable medium (CRM) 610 that may store some or all of the instructions 608. The CRM 610 may include a transitory and/or non-transitory computer-readable medium.

The instructions 608, when executed by the processor 602, may cause the system 600 (or one or more portions thereof) to perform one or more methodological acts or processes, such as those described herein. As an example, execution of the instructions 608 may cause or provide for control of fuel distribution.

The data 606 may include total fuel flow, rotor speed, derivative of rotor speed or change in rotor speed, fuel-air ratio, etc. The data 606 may be analyzed to control a distribution of fuel flow and/or to control the state of a valve (e.g., valve 432 of FIG. 4).

The system 600 may include one or more input/output (I/O) devices 612 that may be used to provide an interface between the system 600 and one or more additional systems or entities. The I/O devices 612 may include one or more of a graphical user interface (GUI), a display screen, a touchscreen, a keyboard, a mouse, a joystick, a pushbutton, a microphone, a speaker, a microphone, a transceiver, etc. The I/O devices 612 may include one or more sensors that may be configured to measure/detect one or more parameters associated with the operation of an aircraft, such as the state of one or more pilot controls that may have an impact on how fuel should be distributed. The I/O devices 612/system 600 may include an engine controller configured to gather data and perform calculations to generate one or more commands, potentially based on one or more parameters.

The system 600 is illustrative. In some embodiments, one or more of the components or devices may be optional. In some embodiments, the components/devices may be arranged in a manner that is different from what is shown in FIG. 6. In some embodiments, additional components or devices not shown may be included. For example, in embodiments where the system 600 is included as part of one or more networks, one or more switches, routers, and the like may be included.

Figure 7:
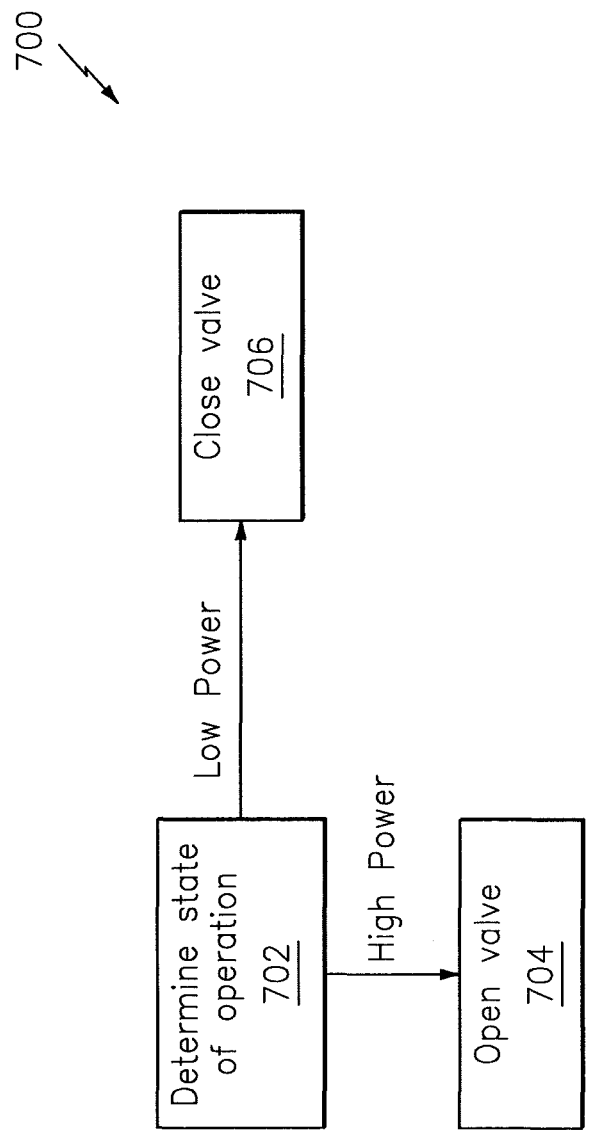
FIG. 7 illustrates a flow chart of an exemplary method.

FIG. 7 is a flow chart of a method 700. The method 700 may be executed by, or tied to, one or more systems, devices, or components, such as those described herein. For example, the method 700 may be executed by the processor 602 of FIG. 6 in order to control or regulate a distribution of fuel with respect to one or more nozzles associated with an aircraft engine.

In block 702, a determination may be made whether the aircraft or engine is operating in a high power state or a low power state. Such a determination may be based on an examination of one or more parameters, potentially with respect to (e.g., in comparison to) one or more thresholds. The parameters and/or thresholds may be included in the data 606 of FIG. 6. If the determination of block 702 indicates operation in the high power state, flow may proceed from block 702 to block 704. Otherwise the operation is in the low power state and flow may proceed from block 702 to block 706.

In block 704, a valve (e.g., valve 432 of FIG. 4) may be opened (or remain open) to provide for a uniform/symmetric flow of fuel.

In block 706, a valve (e.g., valve 432 of FIG. 4) may be closed (or remain closed) to provide for a non-uniform/asymmetric flow of fuel.

Technical effects and benefits of this disclosure include a selective control and distribution of fuel to nozzles of an aircraft. The control exerted over the distribution of the fuel may be used to reduce a level of noise that is output by the aircraft or an associated device/component. As a rough order of magnitude, the noise may be reduced on the order of approximately 20 dB in some embodiments via incorporation of the techniques that are described herein. Furthermore, the control exerted over the distribution of fuel may improve or enhance engine stability, particularly under low power or low fuel flow conditions by enhancing or enriching a subset of nozzles in terms of fuel availability/output.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A method for controlling a distribution of fuel to a plurality of nozzles associated with at least one aircraft engine, the method comprising:
   determining, by a processor, a state of operation associated with the at least one aircraft engine;
   causing, by the processor, a valve coupled to a fuel supply and each of the nozzles to open when it is determined that the state of operation indicates a high power state relative to at least one threshold;
   causing, by the processor, the valve to close when it is determined that the state of operation indicates a low power state relative to the at least one threshold;
   establishing, by the processor, a first primary flow number for a first group of the nozzles; and
   establishing, by the processor, a second primary flow number that is different from the first primary flow number for a second group of the nozzles to account for head-effects.

2. The method of claim 1, wherein the second primary flow number is less than the first primary flow number, and wherein the first group of nozzles is located at a higher altitude than the second group of nozzles.

3. The method of claim 1, wherein the fuel supply is coupled to a first group of the nozzles via a primary line, and wherein the valve is coupled to a second group of the nozzles via a secondary line, the method comprising:
   establishing a differential pressure of approximately 20 pounds per square inch between the primary line and the secondary line when the valve is open; and
   establishing a differential pressure of approximately 120 pounds per square inch between the primary line and the secondary line when the valve is closed.

4. A system for controlling a distribution of fuel on an aircraft, the system comprising:
   a plurality of nozzles associated with at least one aircraft engine; and
   a valve coupled to a fuel supply and each of the nozzles, wherein the valve is configured to be opened when a state of operation associated with the at least one aircraft engine indicates a high power state relative to at least one threshold, and
   wherein the valve is configured to be closed when the state of operation associated with the at least one aircraft engine indicates a low power state relative to the at least one threshold, and
   wherein a first group of the nozzles has an associated first primary flow number, and wherein a second group of the nozzles has an associated second primary flow number that is different from the first primary flow number to account for head-effects.

5. The system of claim 4, further comprising:
   a primary line configured to couple the fuel supply to a subset of the nozzles; and
   a secondary line configured to couple the valve and each of the nozzles.

6. The system of claim 5, wherein the valve is configured to establish a differential pressure of approximately 20 pounds per square inch between the primary line and the secondary line when the valve is open, and wherein the valve is configured to establish a differential pressure of approximately 120 pounds per square inch between the primary line and the secondary line when the valve is closed.

7. The system of claim 5, wherein the subset of nozzles corresponds to between one-sixth and one-third of the plurality of nozzles, inclusive.

8. The system of claim 4, wherein the nozzles are arranged in a ring.

9. The system of claim 4, wherein the second primary flow number is less than the first primary flow number, and wherein the first group of nozzles is located at a higher altitude than the second group of nozzles.

10. The system of claim 9, wherein the first primary flow number and the second primary flow number are each expressed as an amount of fuel flow divided by the square root of a pressure drop, and wherein the first primary flow number is equal to approximately 2.0, and wherein the second primary flow number is equal to approximately 1.5.

11. The system of claim 4, wherein the first primary flow number is based on a first size of holes machined into the first group of nozzles, and wherein the second primary flow number is based on a second size of holes machined into the second group of nozzles, and wherein the second size is different from the first size.

12. A system for controlling a distribution of fuel on an aircraft, the system comprising:
a first manifold inlet coupled to a subset of a plurality of nozzles;
a second manifold inlet coupled to each of the nozzles;
a primary line coupled to the first manifold inlet and a fuel supply;
a valve coupled to the fuel supply; and
a secondary line coupled to the valve and the second manifold inlet,
wherein a first group of the subset of the nozzles has an associated first primary flow number, and wherein a second group of the subset of the nozzles has an associated second primary flow number that is different from the first primary flow number to account for head-effects.

13. The system of claim 12, wherein the valve is configured to be opened when a state of operation associated with at least one engine of the aircraft indicates a high power state relative to at least one threshold, and wherein the valve is configured to be closed when the state of operation associated with the at least one engine indicates a low power state relative to the at least one threshold, and wherein the at least one threshold is based on a maximum thrust associated with the at least one engine.

14. The system of claim 12, further comprising:
at least one processor; and
memory having instructions stored thereon that, when executed by the at least one processor, cause the system to:
determine a state of operation associated with at least one engine of the aircraft;
cause the valve to open when it is determined that the state of operation indicates a high power state relative to at least one threshold; and
cause the valve to close when it is determined that the state of operation indicates a low power state relative to the at least one threshold.

15. The system of claim 12, wherein the valve is configured to establish a differential pressure of approximately 20 pounds per square inch between the primary line and the secondary line when the valve is open, and wherein the valve is configured to establish a differential pressure of approximately 120 pounds per square inch between the primary line and the secondary line when the valve is closed.

16. The system of claim 12, wherein the second primary flow number is less than the first primary flow number, and wherein the first group of nozzles is located at a higher altitude than the second group of nozzles.

17. The system of claim 12, wherein the first primary flow number and the second primary flow number are each expressed as an amount of fuel flow divided by the square root of a pressure drop, and wherein the first primary flow number is equal to approximately 2.0, and wherein the second primary flow number is equal to approximately 1.5.

* * * * *